United States Patent
Hubbard et al.

(10) Patent No.: US 6,319,170 B1
(45) Date of Patent: Nov. 20, 2001

(54) MODEL-BASED ENGINE TORQUE CONTROL FOR POWER-ON DOWNSHIFTING IN AN AUTOMATIC TRANSMISSION

(75) Inventors: Gregory A Hubbard, Carmel; Timothy Alan Robinson, Avon, both of IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/574,928

(22) Filed: May 19, 2000

(51) Int. Cl.$^7$ ................................................. B60R 41/04
(52) U.S. Cl. ........................... 477/107; 477/116; 477/117
(58) Field of Search .................................... 477/105, 107, 477/111, 116, 117

(56) References Cited

U.S. PATENT DOCUMENTS

| | | | |
|---|---|---|---|
| 4,070,927 | 1/1978 | Polak | 74/765 |
| 4,653,351 | 3/1987 | Downs et al. | 74/866 |
| 4,796,490 | 1/1989 | Butts et al. | 74/866 |
| 5,029,494 | 7/1991 | Lentz et al. | 74/866 |
| 5,036,729 * | 8/1991 | Nitz et al. | 74/866 |
| 5,070,747 | 12/1991 | Lentz et al. | 74/866 |
| 5,079,970 | 1/1992 | Butts et al. | 74/858 |
| 5,445,576 * | 8/1995 | Motamedi et al. | 477/105 |
| 5,601,506 | 2/1997 | Long et al. | 475/120 |
| 5,795,262 * | 8/1998 | Robinson | 477/92 |

* cited by examiner

Primary Examiner—Sherry Estremsky
Assistant Examiner—Tisha D. Lewis
(74) Attorney, Agent, or Firm—Laura C. Hargitt; Leslie C. Hodges

(57) ABSTRACT

An improved engine torque control for an automatic transmission power-on downshift, wherein a dynamic model of the transmission is used to schedule both shift progression and engine torque reduction based on a desired trajectory of the transmission input shaft during the shift and the driver torque demand. The shift is initiated with the off-going clutch by using the dynamic model to conform the input speed to the desired trajectory, and the torque reduction is initiated based on an estimate of the time to synchronization relative to an expected control delay so that the torque reduction occurs when the input speed reaches synchronization. An appropriate torque reduction amount is calibrated for a specified driver torque demand, and in operation, the amount of torque reduction for a given shift is determined based on the current driver torque demand and a detected deviation of the desired trajectory from a nominal trajectory corresponding to the specified driver torque demand. Aberrant conditions, including failure of the input speed to reach synchronization and input speed flaring are detected and used to modify the engine torque control so that the shift is completed in a timely manner. Using the dynamic model to scheduling the torque control achieves more consistent shift feel and improved adaptability to different powertrain and vehicle-type configurations, and reduces the number of calibrated parameters requiring adaptive correction.

10 Claims, 5 Drawing Sheets

| RANGE \ CLUTCH | C1 | C2 | C3 | C4 | C5 |
|---|---|---|---|---|---|
| 1st | X | | | | X |
| 2nd | X | | | X | |
| 3rd | X | | X | | |
| 4th | X | X | | | |
| 5th | | X | X | | |
| 6th | | X | | X | |
| R | | | X | | X |
| N | | | | | X |

# MODEL-BASED ENGINE TORQUE CONTROL FOR POWER-ON DOWNSHIFTING IN AN AUTOMATIC TRANSMISSION

TECHNICAL FIELD

This invention relates to the control of power-on downshifting in an automatic transmission, and more particularly to a model-based control of engine torque during the downshift.

BACKGROUND OF THE INVENTION

In general, a motor vehicle automatic transmission includes a number of gear elements and selectively engageable friction elements (referred to herein as clutches) that are controlled to establish one of several forward speed ratios between the transmission input and output shafts. The input shaft is coupled to the vehicle engine through a fluid coupling such as a torque converter, and the output shaft is coupled to the vehicle drive wheels through a differential gearset. Shifting from a currently established speed ratio to new speed ratio involves, in most cases, disengaging a clutch (off-going clutch) associated with the current speed ratio and engaging a clutch (on-coming clutch) associated with the new speed ratio.

Various techniques have been used for electronically controlling the oncoming and off-going clutches during a power-on downshift. For example, the U.S. Pat. Nos. 5,029,494 and 5,070,747 to Lentz et al. disclose power-on downshift controls in which the off-going clutch is controllably released in an established sequence to allow the engine to accelerate the transmission input shaft to a post-shift or synchronization speed, whereafter the shift is completed by engaging the on-coming clutch and dis-engaging the off-going clutch. Similar control techniques are also described in the U.S. Pat. No. 4,653,351 to Downs et al., and the U.S. Pat. Nos. 4,796,490 and 5,079,970 to Butts et al. Additionally, it is known that the shift quality can be enhanced by momentarily reducing the engine torque as the input speed approaches the synchronization speed. For example, in Butts et al. U.S. Pat. No. 5,079,970, the engine spark timing is retarded when the slip of the on-coming clutch drops to a predefined value; the spark retard reduces the engine output torque by a predefined amount, and is immediately ramped out at an open-loop ramp rate to achieve a smooth torque transient upon completion of the shift.

While the known engine torque controls have the capability of enhancing downshift quality, control parameters such as the timing and quantity of torque reduction have been only generally defined, so that the potential enhancements are fully achieved only occasionally. Also, it has been found that torque controls not uniquely suited to a given set of shift conditions can actually degrade the shift quality. Accordingly, what is needed is an engine torque control that is uniquely suited to the particular shift conditions, and that can respond to and correct aberrant conditions occasioned by errors in the engine torque and clutch controls.

SUMMARY OF THE INVENTION

The present invention is directed to an improved engine torque control for an automatic transmission power-on downshift, wherein a dynamic model of the transmission is used to schedule both shift progression and engine torque reduction based on a desired trajectory of the transmission input shaft during the shift and the driver torque demand. The shift is initiated with the off-going clutch by using the dynamic model to conform the input speed to the desired trajectory, and the torque reduction is initiated based on an estimate of the time to synchronization relative to an expected control delay so that the torque reduction occurs when the input speed reaches synchronization. An appropriate torque reduction amount is calibrated for a specified driver torque demand, and in operation, the amount of torque reduction for a given shift is determined based on the current driver torque demand and a detected deviation of the desired trajectory from a nominal trajectory corresponding to the specified driver torque demand. Aberrant conditions, including under-achievement and over-achievement of input speed synchronization are detected and used to modify the engine torque control so that the shift is completed in a timely manner. Using the dynamic model to schedule the torque control achieves more consistent shift feel and improved adaptability to different powertrain and vehicle-type configurations, and reduces the number of calibrated parameters requiring adaptive correction.

DESCRIPTION OF THE PREFERRED EMBODIMENT

The control of this invention is described in the context of a multi-ratio power transmission having a planetary gearset of the type described in the U.S. Pat. No. 4,070,927 to Polak, and having an electro-hydraulic control of the type described in U.S. Pat. No. 5,601,506 to Long et al. Accordingly, the gearset and control elements shown in FIG. 1 hereof have been greatly simplified, it being understood that further information regarding the fluid pressure routings and so on may be found in the aforementioned patents.

Figures 1, 2:
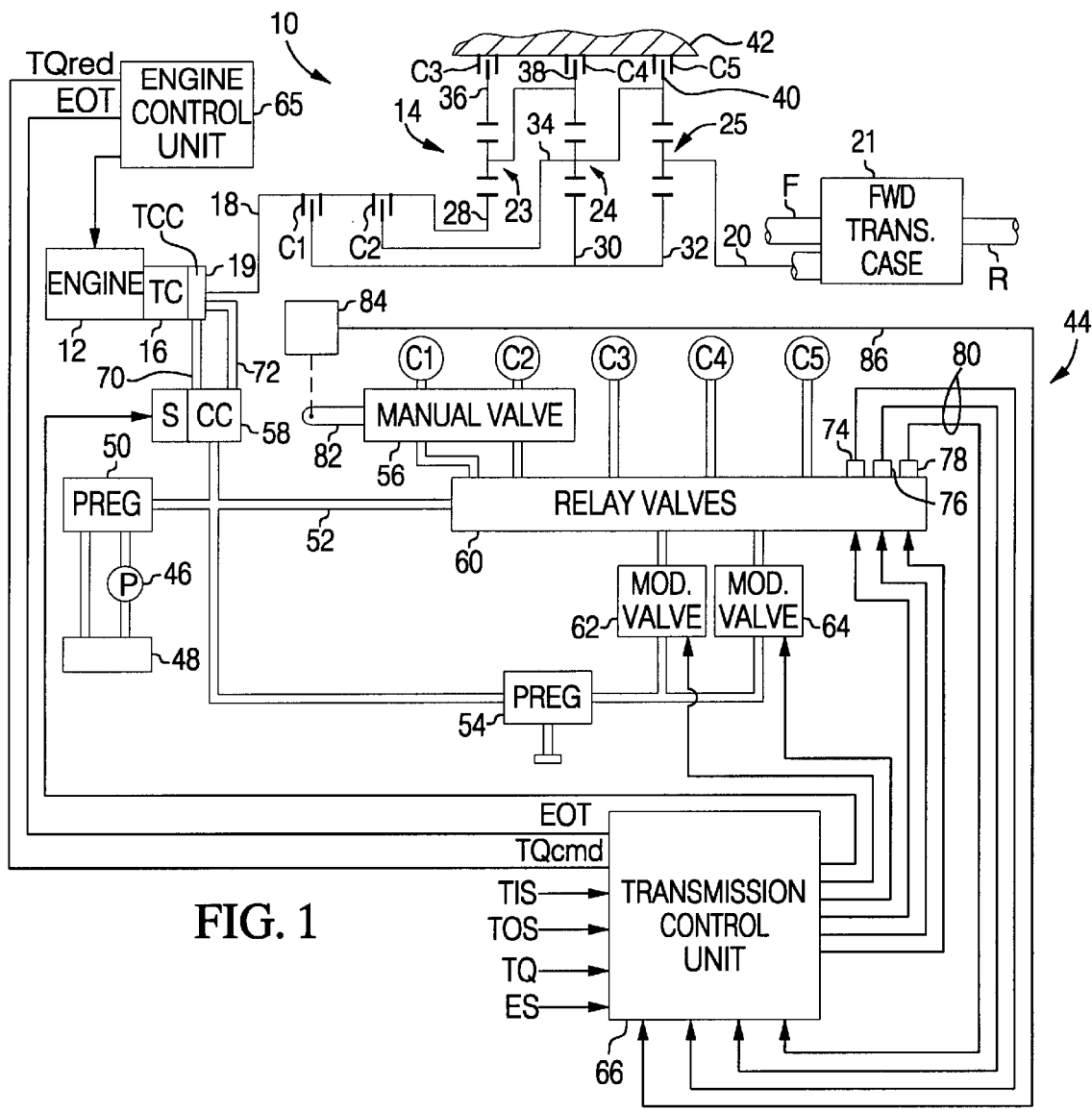
FIG. 1 is a diagram of an automatic transmission and microprocessor-based control unit for carrying out the control of this invention.
FIG. 2 is a table indicating a relationship between transmission clutch activation and corresponding speed ratio.

Referring to FIG. 1, the reference numeral 10 generally designates a vehicle powertrain including engine 12, transmission 14, and a torque converter 16 providing a fluid coupling between engine 12 and transmission input shaft 18. A torque converter clutch 19 is selectively engaged under certain conditions to provide a mechanical coupling between engine 12 and transmission input shaft 18. The transmission output shaft 20 is coupled to the driving wheels of the vehicle in one of several conventional ways. The illustrated embodiment depicts a four-wheel-drive (FWD) application in which the output shaft 20 is connected to a transfer case 21 that is also coupled to a rear drive shaft R and a front drive shaft F. Typically, the transfer case 21 is manually shiftable to selectively establish one of several drive conditions, including various combinations of two-wheel-drive and four-wheel drive, and high or low speed range, with a neutral condition occurring intermediate the two and four wheel drive conditions.

The transmission 14 has three inter-connected planetary gearsets, designated generally by the reference numerals 23, 24 and 25. The input shaft 18 continuously drives a sun gear 28 of gearset 23, selectively drives the sun gears 30, 32 of gearsets 24, 25 via clutch C1, and selectively drives the carrier 34 of gearset 24 via clutch C2. The ring gears 36, 38, 40 of gearsets 23, 24, 25 are selectively connected to ground 42 via clutches C3, C4 and C5, respectively.

As diagrammed in FIG. 2, the state of the clutches C1–C5 (i.e., engaged or disengaged) can be controlled to provide six forward speed ratios (1, 2, 3, 4, 5, 6), a reverse speed ratio (R) or a neutral condition (N). For example, the first forward speed ratio is achieved by engaging clutches C1 and C5. Shifting from one speed forward speed ratio to another is generally achieved by disengaging one clutch (referred to as the off-going clutch) while engaging another clutch (referred to as the on-coming clutch). For example the transmission 14 is shifted from first to second by disengaging clutch C5 while engaging clutch C4.

The torque converter clutch 19 and the transmission clutches C1–C5 are controlled by an electro-hydraulic control system, generally designated by the reference numeral 44. The hydraulic portions of the control system 44 include a pump 46 which draws hydraulic fluid from a reservoir 48, a pressure regulator 50 which returns a portion of the pump output to reservoir 48 to develop a regulated pressure in line 52, a secondary pressure regulator valve 54, a manual valve 56 manipulated by the driver of the vehicle and a number of solenoid operated fluid control valves 58–64.

The electronic portion of the control is primarily embodied in the engine control unit 65 and the transmission control unit 66, illustrated in FIG. 1 as two separate modules. Both control units 65, 66 are microprocessor-based, and may be conventional in architecture. The engine control unit 65 controls the operation of engine functions such as fuel, spark timing, and so on depending on the control variables afforded by engine 12, and the transmission control unit 66 controls the solenoid operated fluid control valves 58–64 based on a number of inputs to achieve a desired transmission speed ratio. The transmission control unit inputs include signals representing the transmission input speed TIS, engine speed ES, a driver torque request TQ, and the transmission output speed TOS. Sensors for developing such signals may be conventional in nature, and have been omitted for simplicity. Additionally, the engine control unit 65 supplies an engine output torque signal EOT to transmission control unit 66, and transmission control unit 66 supplies a torque reduction command signal TQred to engine control unit 65.

The control lever 82 of manual valve 56 is coupled to a sensor and display module 84 that produces a diagnostic signal on line 86 based on the control lever position; such signal is conventionally referred to as a PRNDL signal, since it indicates which of the transmission ranges (P, R, N, D or L) has been selected by the vehicle driver. Finally, the fluid control valves 60 are provided with pressure switches 74, 76, 78 for supplying diagnostic signals to control unit 66 on lines 80 based on the respective relay valve positions. The control unit 66, in turn, monitors the various diagnostic signals for the purpose of electrically verifying proper operation of the controlled elements.

The solenoid operated fluid control valves 58–64 are generally characterized as being either of the on/off or modulated type. To reduce cost, the electro-hydraulic control system 44 is configured to minimize the number of modulated fluid control valves, as modulated valves are generally more expensive to implement. To this end, a set of three on/off relay valves, shown in FIG. 1 as a consolidated block 60, are utilized in concert with manual valve 56 to enable controlled engagement and disengagement of each of the clutches C1–C5 with only two modulated valves 62, 64. For any selected ratio, the control unit 66 activates a particular combination of relay valves 60 for coupling one of the modulated valves 62, 64 to the on-coming clutch, and the other modulated valve 62, 64 to the off-going clutch.

The modulated valves 62, 64 each comprise a conventional pressure regulator valve biased by a variable pilot pressure that is developed by current controlled force motor. The fluid controlled valve 58 is also a modulated valve, and controls the fluid supply path to converter clutch 19 in lines 70, 72 for selectively engaging and disengaging the converter clutch 19. The transmission control unit 66 determines pressure commands for smoothly engaging the on-coming clutch while smoothly disengaging the off-going clutch, develops corresponding force motor current commands, and then supplies current to the respective force motors in accordance with the current commands.

In a power-on downshift, the transmission speed ratio (TIS/TOS) is increased, which requires that the engine 12 accelerate the transmission input shaft 18 from a pre-shift speed defined by the product (TOS*SRold) to a synchronization speed defined by the product (TOS*SRnew), where SRold is the old or current speed ratio, and SRnew is the new or desired speed ratio. In general, this can be achieved by controllably releasing the off-going clutch pressure while preparing the on-coming clutch for engagement, and then releasing the off-going clutch as the on-coming clutch engages. Indeed, this is the general control premise of the aforementioned U.S. Pat. Nos. 5,029,494, 5,070,747, 4,653, 351, 4,796,490 and 5,079,970.

Figure 3:
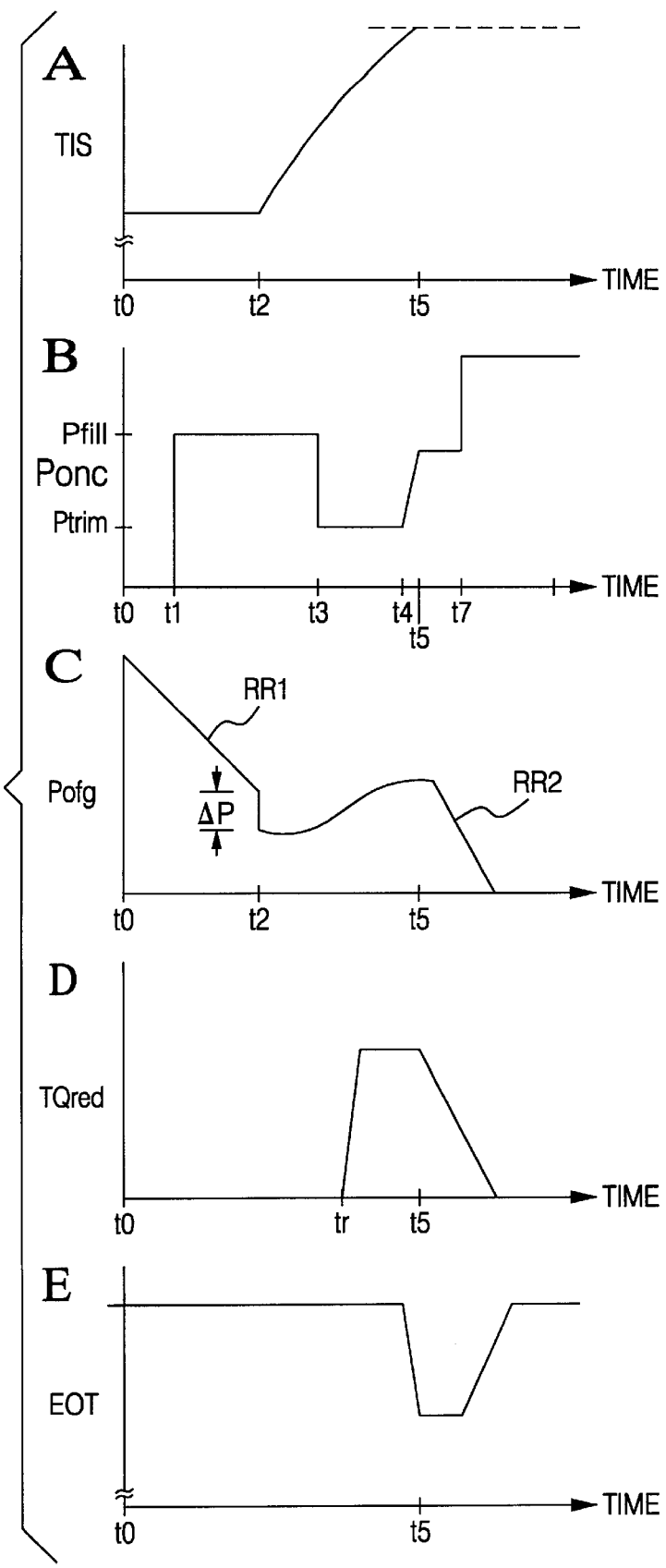
FIG. 3 graphically depicts a power-on downshift according to this invention as carried out by the control unit of FIG. 1.

The present control, on the other hand, utilizes a dynamic model of the transmission that takes into account dynamic variations in input torque, and that schedules shift-specific engine torque reduction for shift quality enhancement. FIG. 3 graphically illustrates a power-on downshift according to this invention, with Graphs A–E respectively depicting the transmission input speed TIS, the on-coming clutch pressure command Ponc, the off-going clutch pressure command Pofg, the engine torque reduction command TQred, and the engine output torque EOT. In general, the shift is initiated by progressively reducing Pofg, resulting in off-going clutch slippage at time t2. At such point, Pofg is adjusted to a new level and then controlled to allow the engine to raise the input speed TIS at a desired rate to a synchronization speed (SYNC) defined by the product of the new speed ratio (SRnew) and the output speed TOS. The time Ts remaining until TIS reaches SYNC is estimated based on measured input acceleration and on-coming clutch slip. The on-coming pressure command Ponc and the engine torque reduction command TQred are both initiated based on the estimated time Ts. The pressure command Ponc is initiated so that the on-coming clutch will be ready for engagement at time t4 when Ts reaches a reference time, and the torque reduction command TQred is initiated at time tr when Ts falls to a reference time Tdelay corresponding to an expected delay in realizing the torque command. Accordingly, the commanded torque reduction occurs at time t5 in coincidence with TIS reaching SYNC (i.e., when Ts=0). In the interval t4–t7, Ponc and Pofg are controlled to maintain TIS at or near SYNC, and the shift is completed at time t7 by fully engaging the on-coming clutch and fully disengaging the off-going clutch.

In the illustrated embodiment, the off-going pressure control is designed to initiate off-going clutch slip (SLIPofg) a given time Tofg_slip(des) after shift initiation. This is achieved by ramping Pofg downward at a ramp rate RRI so that its value at the conclusion of the interval Tofg_slip (des)—that is, at time t2—produces a torque capacity corresponding to the minimum reaction torque (TQofg_reaction) required to hold the off-going clutch without slipping. This reaction torque may be computed as a pressure Pofg_reaction according to the expression:

$$Pofg\_reaction = Kcl * klv * TQin \quad (1)$$

where Kcl is pressure-to-torque gain of the off-going clutch, Klv is the leverage gain corresponding to the old or current speed ratio, and TQin is the transmission input torque. The input torque TQin is subject to variation during the shift, and may be computed based on the engine output torque EOT and the torque ratio TR of torque converter 19. The ramp rate RR1 is set by calibration, and Pofg during the interval t0–t2 is subject to adaptive adjustment based on a detected deviation between the time Tofg_slip(des) and the time when off-going clutch slip actually occurs. Thus, the off-going pressure in the interval t0–t2 is given by the equation:

$$Pofg = Pofg\_reaction + (RR1*t) + Pofg\_adaptive \quad (2)$$

where Pofg_adaptive is the adaptive correction, and t is the accumulated time ramping at the rate RR1.

Once the off-going clutch begins to slip, the off-going pressure is controlled so that the input speed will rise toward the SYNC speed at a desired rate TIS_DOT(des) based on driver torque demand TQ. The off-going clutch control involves the combination of a feed-forward component based on the dynamic model of the transmission, and a feed-back component based on a detected input speed error. The dynamic model of the transmission during this phase of the control comprehends the inertial effects of the engine and transmission, and is given according to the equation:

$$Pofg\_accel = Kcl[(Klv*TQin) + (Kin*TIS\_DOT(des)) + (Keng*ES\_DOT(des))] \quad (3)$$

where Pofg_accel is the off-going pressure required to accelerate the input shaft at the desired acceleration TIS_DOT(des), ES_DOT(des) is the engine acceleration corresponding to TIS_DOT(des), Kin is an inertia coefficient for the input shaft 18, and Keng is an inertia coefficient for the engine 12. The coefficients Kin and Keng are negative in sign, reflecting the fact that an increase in TIS_DOT(des) necessitates a decrease in Pofg_accel.

Although the off-going clutch will theoretically begin slipping at time t2 when Pofg falls to the computed value of Pofg_reaction, slipping may actually begin slightly before or after time t2 due to modeling inaccuracies of equation (1). Regardless of such inaccuracies, it is certain that the offgoing clutch reaction torque TQofg_reaction is in equilibrium with the input torque TQin at the instant of off-going clutch slippage. Accordingly, the off-going clutch pressure for input acceleration control is adjusted relative to the modeled off-going pressure when slip is detected. Such pressure is designated as Pofg_at_slip, and is determined as follows:

$$Pofg\_at\_slip = Pofg\_accel(\text{at slip}) + Pofg\_hyd\_delay \quad (4)$$

where Pofg_accel(at slip) is the value of Pofg_accel (equation 3) when the off-going clutch begins to slip, and Pofg_hyd_delay is a pressure offset due to the hydraulic response delay of the off-going clutch. The hydraulic response delay HD is calibrated for any given clutch, and the term Pofg_hyd_delay is given according to the product (HD*RR1), where RR1 is the off-going pressure ramp rate prior to off-going slip detection. Thus, when off-going clutch slippage is detected, the off-going pressure Pofg is changed by a value ΔP determined according to the equation:

$$\Delta P = Pofg\_reaction - Pofg\_accel(\text{at slip}) - (HD*RR1) \quad (5)$$

The pressure change may be made in a single step as illustrated in FIG. 3, or may be made in a series of smaller steps if desired. Thereafter, the off-going pressure Pofg is repeatedly computed in the interval t2–t5 according to the equation:

$$Pofg(\text{new}) = Pofg(\text{old}) + Pofg\_accel(\text{new}) - Pofg\_accel(\text{at slip}) + (K*SPD\_ERR) \quad (6)$$

where Pofg(old) is the previous off-going pressure command, Pofg_accel(new) is the evaluation of equation (3) based on the current value of input torque TQin, Pofg_accel(at slip) is the evaluation of equation (3) at the initiation of off-going clutch slippage, K is a closed-loop proportional gain constant, and SPD_ERR is the closed-loop speed error between the TIS and a desired input speed corresponding to TIS_DOT(des).

While the off-going clutch pressure is being controlled to initiate and then control off-going clutch slip, the on-coming clutch is prepared for engagement by setting Ponc to a fill pressure Pfill for a predetermined fill interval (t1–t3), and then lowering Ponc to a trim value sufficient to maintain the on-coming clutch in readiness for engagement. In the preferred embodiment, the combined duration of the fill and trim periods (that is, the interval t1–t4) is designed to be substantially constant for a given shift, regardless of the engine speed or torque. Consequently, the on-coming pressure control is initiated after a variable fill delay Tdelay (defined by the interval t0–t1 in FIG. 3) computed as follows:

$$Tdelay = Tshift - (Tfill + Ttrim) \quad (7)$$

where Tfill is the fill interval t1–t3, Ttrim is the low pressure trim interval t3–t4, and Tshift is the estimated time required to accelerate the input speed to the synchronization speed SYNC, given the desired acceleration TIS_DOT(des). Thus, Tshift may be given by the equation:

$$Tshift = Tofg\_slip(des) + (SYNC - TIS\_init)/TIS\_DOT(des) \quad (8)$$

where TISinit is the input speed TIS at time t2.

The fill pressure Pfill is typically scheduled as a function of fluid temperature Tsump, and the fill time Tfill for any given clutch is determined according to the product of a calibrated fill time Tcal and a factor F representing the percent of fluid exhausted from the clutch since the last shift involving that clutch. Thus, the factor F accounts for any fluid remaining in the clutch, and is given according to the ratio of the time that the clutch has been exhausted to a calibrated time required to fully exhaust the clutch fluid, not to exceed a value of one. Preferably, Pfill is adaptively adjusted by iterative reduction to ensure that TIS will not significantly exceed SYNC; an adaptive adjustment of this type is disclosed in the aforementioned U.S. Pat. No. 5,070,747, which is incorporated herein by reference. The time Ttrim is calibrated, and the pressure Ptrim may be calibrated or determined through adaptive learning.

When the input speed TIS nears SYNC, the on-coming and off-going clutch pressures are controlled to maintain the input speed at SYNC. The on-coming pressure control is initiated when the estimated time to reach SYNC falls to a predetermined time, represented by the interval t4–t5 in Graph B. As indicated above, the time to synchronization Ts may be estimated based on the measured on-coming clutch slip speed (SYNC–TIS) divided by the input shaft acceleration (measured or desired). In the interval t4–t7, the dynamic model of the transmission is used to schedule on-coming pressure based on the input torque TQin and an inertia torque component designed to decelerate TIS in case TIS exceeds SYNC. The model equation for the on-coming synchronization control pressure Ponc_sync is given by:

$$Ponc\_sync = Kcl[(Klv*TQin) + (Kin*TIS\_DOT(sync)) + (Keng*ES\_DOT(sync))] \quad (9)$$

where Kcl[(Klv*TQin)] is the input torque dependent component, and Kcl[(Kin*TIS_DOT(sync))+ (Keng*ES_DOT(sync))] is the inertia torque component that is used if TIS exceeds SYNC. The terms TIS_DOT(sync) and ES_DOT(sync) represent desired input and engine pull-down rates for the case where TIS exceeds SYNC.

The off-going clutch pressure when TIS reaches SYNC at time t5 is a combination of a calibrated open-loop ramp and a closed-loop term that increases the pressure as required to hold TIS at SYNC. Specifically, the pressure is repeatedly computed using the equation:

$$Pofg(new) = Pofg(sync) - (RR2*Tsync) + (Kp*SLIPonc) + (Ki*\Sigma(SLIPonc)) \quad (10)$$

where Pofg(sync) is the pressure command value at the beginning of the SYNC control period at time t5, RR2 is the open-loop ramp rate, Tsync is the accumulated time in the SYNC control logic (defined as the current time t minus the SYNC initiation time t5), Kp and Ki are proportional and integral closed-loop gain terms, and SLIPonc is the on-coming clutch slip.

In the shift of FIG. 3, the input speed TIS does not exceed SYNC; accordingly, the on-coming pressure in the interval t5–t7 is based solely on input torque, and the off-going pressure is based solely on the calibrated ramp rate RR2. However, if TIS exceeds SYNC, the inertia torque component of equation (9) raises the on-coming pressure to drive TIS back to SYNC at the calibrated rate TIS_DOT(sync), and the closed-loop components (proportional and integral) of equation (10) raise the off-going pressure in relation to SLIPonc to drive TIS back to SYNC. In either case, the shift is completed when TIS is substantially equal to SYNC for a calibrated period of time Tsync.

Figure 4:
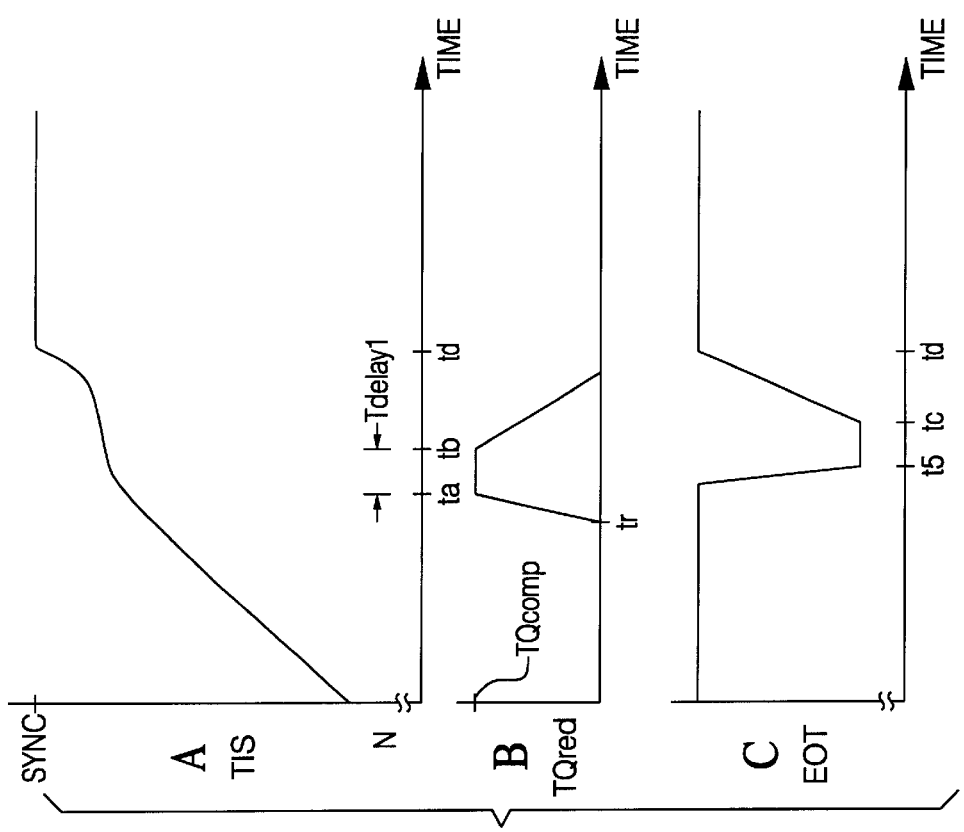
FIG. 4 graphically depicts an engine torque control according to this invention for a detected under-achievement of input speed synchronization.

According to an important aspect of this invention, the engine torque control described in reference to FIG. 3 is adjusted when the input speed fails to stabilize at the SYNC speed. FIG. 4, Graphs A–C, depicts a detected under-achievement of the SYNC speed, while FIG. 5, Graphs A–C, depicts a detected over-achievement of the SYNC speed. In each case, Graph A depicts the input speed TIS, Graph B depicts the torque reduction command TQred, and Graph C depicts the engine output torque EOT.

Referring to FIG. 4, under-achievement of the SYNC speed is detected by comparing the input speed TIS to the SYNC speed a predetermined period of time Tdelay1 after the torque reduction command TQred reaches its computed value TQcomp. If the comparison reveals under-achievement of the SYNC speed, the torque reduction command TQred is immediately ramped out. In FIG. 4, TQred reaches TQcomp at time ta, the synchronization under-achievement is detected at time tb=ta+Tdelay1, and EOT begins to return to its normal level after a response lag interval at time tc. The increased engine output torque, along with the above-described clutch pressure controls, returns TIS to SYNC at time td.

Figure 5:
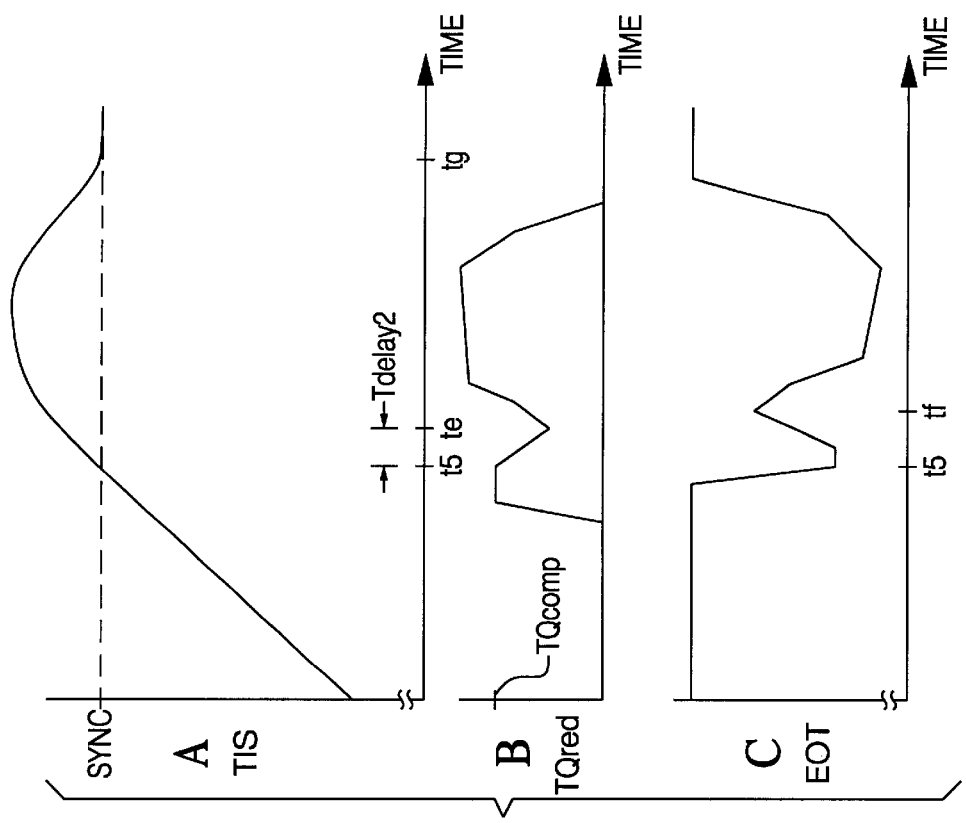
FIG. 5 graphically depicts an engine torque control according to this invention for a detected over-achievement of input speed synchronization.

Referring to FIG. 5, over-achievement of the SYNC speed is detected by comparing the input speed TIS to the SYNC speed a predetermined period of time Tdelay2 after TIS first reaches SYNC. If the comparison reveals over-achievement of the SYNC speed (also referred to as input speed flare), the torque reduction command TQred is immediately increased and then controlled as required to bring TIS back to the SYNC speed. As described below in reference to the flow diagram of FIG. 8, the control of TQred in this condition involves the combination of a model-based feed-forward command and a feedback command. In FIG. 5, TIS reaches SYNC at time t5, the synchronization over-achievement is detected at time te=t5+Tdelay2, and EOT begins to decrease in response to the detected synchronization over-achievement at time tf. The engine output torque control, along with the above-described clutch pressure controls, returns TIS to SYNC at time tg.

Figure 6:
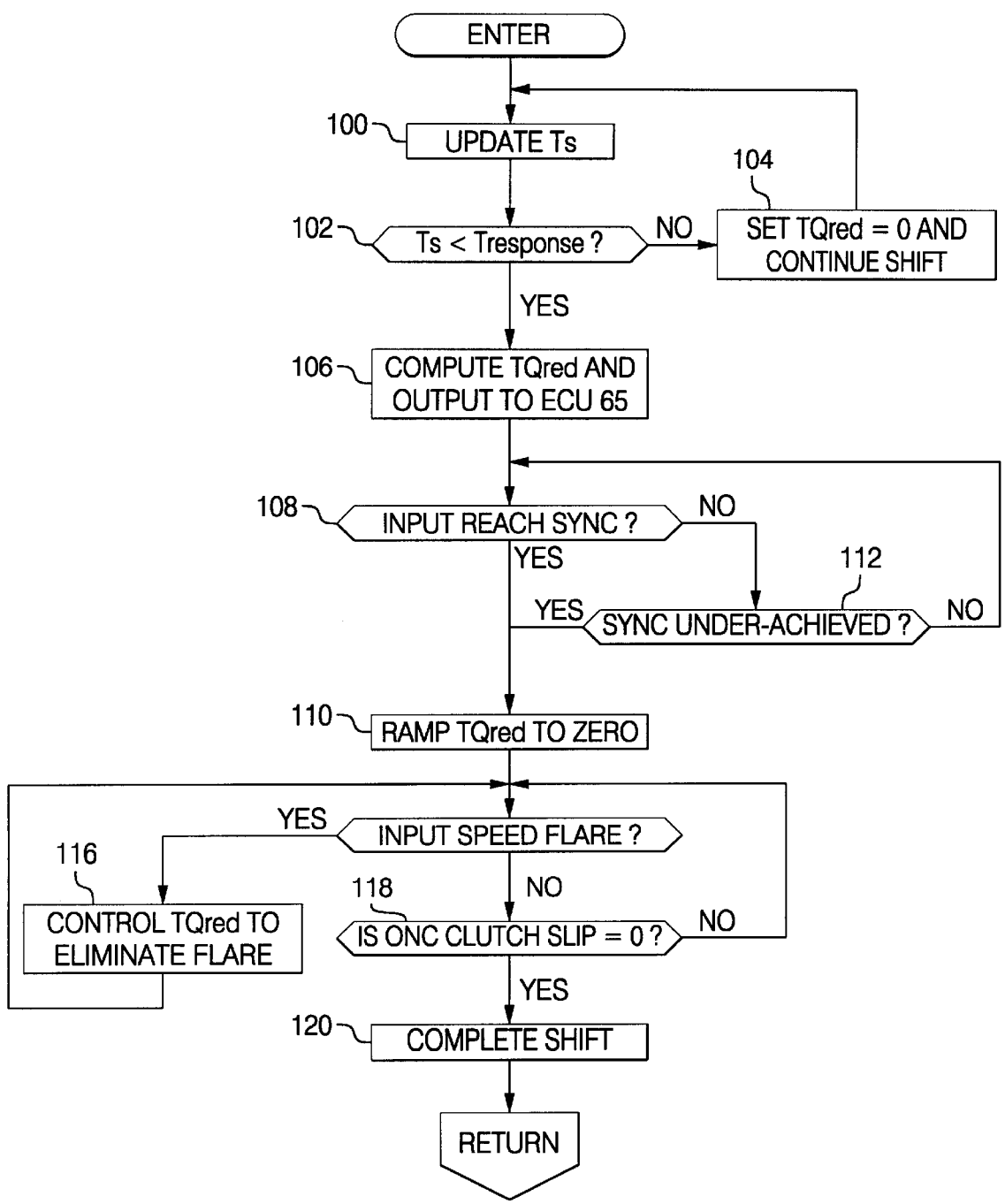
FIG. 6 is a flow diagram depicting a power-on downshift engine torque control according to this invention, as carried out by the control unit of FIG. 1.
Figure 7:
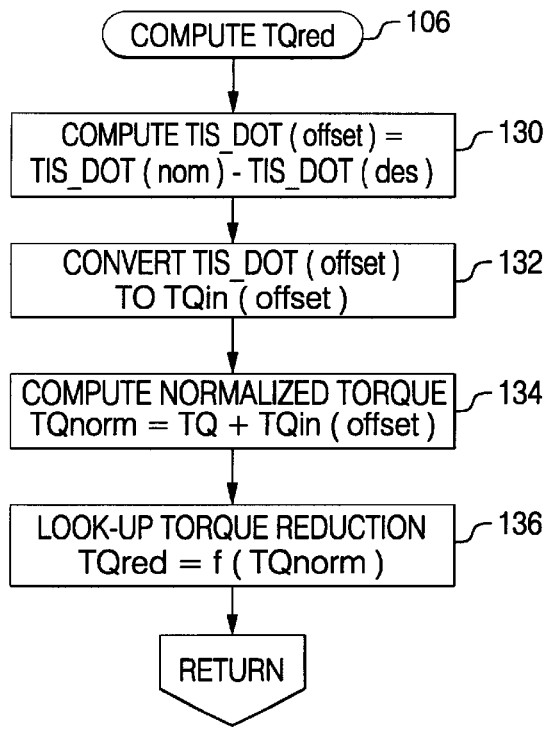
FIG. 7 is a flow diagram detailing a portion of the flow diagram of FIG. 6 concerning computation of a commanded torque reduction.
Figure 8:
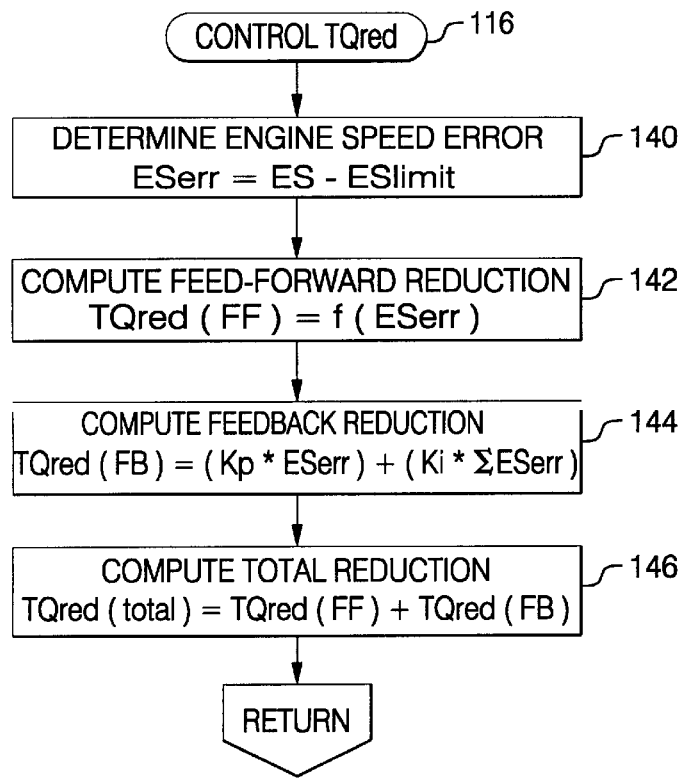
FIG. 8 is a flow diagram detailing a portion of the flow diagram of FIG. 6 concerning adjustment of the commanded torque reduction in response to a detected over-achievement of input speed synchronization.

FIGS. 6–8 depict flow diagrams representative of the downshift engine torque control carried out by the control unit 66 of FIG. 1 according to this invention. FIG. 6 outlines the control, FIG. 7 details the computation of the torque reduction command TQred, and FIG. 8 details the adjustment of TQred in response to a detected over-achievement of synchronization.

Referring to FIG. 6, the estimated time to achievement of synchronization Ts is updated at block 100, and then compared to a response delay interval Tresponse corresponding to an expected delay between the generation of a torque command and achievement of the associated response in engine output torque EOT. The interval Tresponse includes communication delays between the control units 65 and 66, and engine control response delays, and may be determined empirically for a given powertrain configuration. So long as Ts is larger than Tresponse, TQred is set equal to zero, and the blocks 100, 102 are re-executed while the shift proceeds, as noted at block 104. When Ts reaches Tresponse, the block 106 computes a value of TQred as described below in reference to the flow diagram of FIG. 7, and outputs TQred to the engine control unit (ECU) 65. The block 108 and 112 then monitor the input speed TIS relative to the SYNC speed. As indicated above, synchronization under-achievement is detected by comparing TIS to SYNC after a delay Tdelay1 initiated when TQred reaches its computed value TQd. The block 110 is executed to begin ramping TQred back to zero at a predetermined ramp rate to complete the torque control in response to under achievement of the SYNC speed, or achievement of the SYNC speed, whichever occurs first. Thereafter, the block 114 monitors TIS to detect over-achievement of the SYNC speed. As indicated above, this is done by comparing TIS to SYNC after a delay Tdelay2 initiated when TIS reaches SYNC. If synchronization over-achievement is detected, the block 116 adjusts TQred as described below in reference to the flow diagram of FIG. 8 to eliminate the condition and return TIS to SYNC. On the other hand, if no input speed flaring is detected, the block 120 is executed to complete the shift once block 118 indicates that the on-coming clutch slip has been reduced to zero.

As indicated above, the flow diagram of FIG. 7 details the computation of the torque reduction command TQred. The control objective is to schedule TQred so as to achieve consistently smooth shift feel without causing TIS to under-achieve the SYNC speed. Ordinarily, this would require a significant calibration effort. However, according to this invention, the calibration procedure simply involves performing a downshift at maximum driver torque demand TQmax, recording the corresponding acceleration trajectory—referred to herein as the nominal acceleration trajectory TIS_DOT(nom)—and identifying the torque reduction amount (TQred_cal) that best satisfies the above-stated control objective. A second data point is identified in terms of a low driver torque demand for which no engine torque reduction is desired, and a simple look-up table based on the two torque reduction data points (that is, TQred_cal and zero) is addressed based on a normalized driver torque demand TQnorm. The normalized driver torque demand is determined by computing an acceleration offset TIS_DOT (offset) between TIS_DOT(nom) and TIS_DOT(des) for a given shift, converting TIS_DOT(offset) to an equivalent input torque offset TQin(offset) based on the clutch gains and inertia coefficients of equation (3), and then computing the normalized driver torque demand TQnorm according to the difference (TQ−TQin(offset)). In a high driver torque demand downshift, TIS_DOT(offset) and TQin(offset) are near-zero, and TQnorm is substantially equal to TQ, resulting in a torque reduction TQred substantially equal to TQred_cal. In a low driver torque demand downshift, TIS_DOT(offset) and TQin(offset) are relatively high, and TQnorm is significantly less than TQ, resulting in a torque reduction TQred of near zero.

Referring specifically to FIG. 7, the block 130 computes the acceleration offset TIS_DOT(offset), the block 132 converts TIS_DOT(offset) to an equivalent input torque offset TQin(offset), block 134 computes the normalized driver torque demand TQnorm, and block 136 determines a torque reduction command TQred based on TQnorm by table look-up. As indicated above, the command TQred is zero when TQnorm is below a minimum reference value, and then increases with increasing values of TQnorm, up to the calibrated value TQred_cal.

Referring to FIG. 8, the adjustment of TQred in response to a detected synchronization over-achievement involves the combination of a model-based feed-forward command and a feedback command, assuming that the torque converter clutch 19 is engaged. The block 140 computes the error ESerr between a reference speed limit ESlimit (which is set somewhat higher than the SYNC speed) and the engine speed ES. The speed error ESerr is combined with a reference time to form an input acceleration trajectory, and block 142 computes the feed-forward command TQred(FF) based on the trajectory, using model equation (3), if desired. However, as indicated in FIG. 8, the feed-forward command TQred(FF) may alternatively be determined by table look-up as a function of ESerr. The block 144 computes a feedback command TQred(FB) using a conventional proportional-plus-integral control, and the block 146 combines TQred (FF) and TQred(FB) to form the total torque reduction TQred(total).

In summary, the control of this invention enhances the quality of power-on downshifting through an improved initiation and control of engine torque reduction during the shift. The torque control is initiated based on shift progression, and a dynamic model of the transmission is used to schedule the torque reduction amount based on driver torque demand and deviation of the desired trajectory from a nominal trajectory corresponding to a specified calibration setting. Additionally, the torque reduction control is adjusted to correct detected over-achievement and/or under-achievement of the synchronization speed. As a result, the shift quality is enhanced while ensuring that the shift is promptly completed. While described in reference to the illustrated embodiment, it will be understood that various modifications in addition to those mentioned above will occur to those skilled in the art. Thus, it will be understood that controls incorporating these and other modifications may fall within the scope of this invention, which is defined by the appended claims.

What is claimed is:

1. A method of controlling a power-on downshift of a vehicle automatic transmission from a current speed ratio to a target speed ratio, the transmission having an input shaft coupled to receive output torque from a vehicle engine, the method comprising the steps of:

controllably releasing an off-going clutch of the transmission to allow the engine output torque to increase a speed of the input shaft toward a synchronization speed of the target speed ratio in accordance with a determined trajectory;

periodically estimating a time to achievement of the synchronization speed by the input shaft;

commanding a reduction in the engine output torque when the estimated time reaches a reference time corresponding lo an expected response delay in achieving a commanded torque reduction; and progressively reducing the commanded reduction to zero when the input shaft achieves said synchronization speed.

2. The method of claim 1, wherein said trajectory is determined based on driver torque demand, and the method includes the steps of:

calibrating a torque reduction for a specified driver torque demand; and in operation, commanding the reduction in engine output torque based on the calibrated torque reduction, a current driver torque demand, and a deviation of the determined trajectory from a nominal trajectory corresponding to said specified driver torque demand.

3. The method of claim 2, including the steps of:

determining the deviation of the determined trajectory from the nominal trajectory;

converting the determined deviation into a corresponding input torque offset;

determining a normalized driver torque demand based on said current driver torque demand and said input torque offset; and commanding the reduction in engine output torque based on the normalized driver torque demand.

4. The method of claim 3, wherein the commanded reduction in engine output torque is zero when the normalized driver torque demand is below a reference value.

5. The method of claim 1, including the steps of:

detecting an under-achievement of the synchronization speed by said input shaft; and reducing the reduction in engine output torque to zero in response to such detection.

6. The method of claim 5, wherein the step of detecting an under-achievement of the synchronization speed includes the steps of:

comparing a speed of the input shaft to said synchronization speed a predetermined period of time after commanding said reduction in engine output torque; and detecting under-achievement of the synchronization speed when such comparison reveals that the input speed is less than the synchronization speed.

7. The method of claim 1, including the steps of:

detecting an over-achievement of the synchronization speed by said input shaft; and adjusting the reduction in engine output torque in response to such detection so as to return the input shaft to said synchronization speed.

8. The method of claim 7, wherein the step of detecting an over-achievement of the synchronization speed includes the steps of:

comparing a speed of the input shaft to said synchronization speed a predetermined period of time after the input speed achieves said synchronization speed; and detecting over-achievement of the synchronization speed when such comparison reveals that the input speed is greater than the synchronization speed.

9. The method of claim 7, wherein the step of adjusting the reduction in engine output torque includes the steps of:

determining an input speed error based on a deviation of said input shaft from said synchronization speed;

commanding a reduction in engine output torque based on the determined input speed error.

10. The method of claim 9, including the steps of:

determining a feed-forward torque reduction command for eliminating the determined input speed error in a predefined period of time;

determining a feedback torque reduction command in relation to a magnitude and integral of said speed error; and commanding a reduction in engine output torque based on a sum of said feed-forward torque reduction command and said feedback torque reduction command.

* * * * *